(12) United States Patent
Kim et al.

(10) Patent No.: US 9,841,894 B2
(45) Date of Patent: Dec. 12, 2017

(54) METHOD FOR RECOGNIZING FINGERPRINT AND ELECTRONIC DEVICE THEREOF

(71) Applicant: Samsung Electronics Co., Ltd., Gyeonggi-do (KR)

(72) Inventors: Ki-Bong Kim, Daegu (KR); Kyoung-Ok Kim, Gyeongsangbuk-do (KR); Hyeon-Ho Kim, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 14/464,280

(22) Filed: Aug. 20, 2014

(65) Prior Publication Data
US 2015/0054764 A1    Feb. 26, 2015

(30) Foreign Application Priority Data

Aug. 23, 2013  (KR) ........................ 10-2013-0100347

(51) Int. Cl.
| | |
|---|---|
| *G06F 3/0488* | (2013.01) |
| *G06K 9/00* | (2006.01) |
| *G06F 3/041* | (2006.01) |
| *G06F 21/32* | (2013.01) |

(52) U.S. Cl.
CPC ........ *G06F 3/04883* (2013.01); *G06F 3/0416* (2013.01); *G06F 21/32* (2013.01); *G06K 9/00013* (2013.01); *G06F 2203/04808* (2013.01)

(58) Field of Classification Search
CPC ..................... G06F 21/31; G06F 21/32; G06F 2203/04808; G06K 9/00912
See application file for complete search history.

(56) References Cited

U.S. PATENT DOCUMENTS

| | | | |
|---|---|---|---|
| 2004/0131237 A1* | 7/2004 | Machida ............ | G06K 9/00899 382/124 |
| 2005/0169503 A1* | 8/2005 | Howell ................... | G06F 3/011 382/115 |
| 2007/0076923 A1 | 4/2007 | Chiu | |
| 2012/0038572 A1* | 2/2012 | Kim ..................... | G06F 3/04886 345/173 |
| 2012/0127179 A1* | 5/2012 | Aspelin ................... | G06F 21/32 345/441 |
| 2012/0258773 A1* | 10/2012 | Alvarez Rivera .... | G06F 1/1656 455/556.1 |
| 2014/0106711 A1* | 4/2014 | Seo ........................ | H04W 12/06 455/411 |
| 2014/0225821 A1* | 8/2014 | Kim ...................... | H04M 1/236 345/156 |

(Continued)

FOREIGN PATENT DOCUMENTS

| | | |
|---|---|---|
| KR | 20030073536 | 9/2003 |
| KR | 1020090054565 | 6/2009 |

(Continued)

*Primary Examiner* — Lixi C Simpson
(74) *Attorney, Agent, or Firm* — The Farrell Law Firm, P.C.

(57) ABSTRACT

Provided are an electronic device and method for recognizing a fingerprint. The fingerprint recognition method includes deactivating touch recognition using a touch panel based on first touch information on a fingerprint sensor, and performing fingerprint recognition based on second touch information on the fingerprint sensor.

13 Claims, 13 Drawing Sheets

(56) References Cited

U.S. PATENT DOCUMENTS

2014/0225857 A1* 8/2014 Ma .................. G06F 3/0418
                                                    345/174
2014/0302818 A1* 10/2014 Fyke ................ G06F 21/32
                                                    455/411

FOREIGN PATENT DOCUMENTS

| KR | 1020100068044 | 6/2010 |
| KR | 1020100099062 | 9/2010 |
| KR | 1020110108646 | 10/2011 |
| KR | 101231216 | 2/2013 |

* cited by examiner

METHOD FOR RECOGNIZING FINGERPRINT AND ELECTRONIC DEVICE THEREOF

PRIORITY

The present application claims priority under 35 U.S.C. §119 to a Korean Patent Application filed in the Korean Intellectual Property Office on Aug. 23, 2013 and assigned Serial No. 10-2013-0100347, the contents of which are incorporated herein by reference.

BACKGROUND INVENTION

1. Field of the Invention

The present disclosure relates generally to a method for recognizing a fingerprint and electronic device thereof.

2. Description of the Related Art

Due to developments in information, communication and semiconductor technologies, various multimedia electronic devices have been developed for providing various multimedia services. Such devices may provide multimedia services such as a voice call, video call, messenger, broadcast, wireless Internet, image capturing, and music playback service.

As such, a user of the electronic device commonly interacts with a touch panel, in order to activate and operate these services through the electronic device. However, fingerprint recognition errors typically occur in such operation.

Accordingly, there is a need in the art for improved technologies for preventing a fingerprint recognition error from occurring in an electronic device.

SUMMARY OF THE INVENTION

The present disclosure has been made to substantially solve at least the above problems and/or disadvantages and to provide at least the advantages below. Accordingly, an aspect of the present disclosure is to provide an apparatus and method for providing fingerprint recognition service in an electronic device.

Another aspect of the present disclosure is to provide an apparatus and method for reducing a fingerprint recognition error in an electronic device.

Another aspect of the present disclosure is to provide an apparatus and method for reducing a fingerprint recognition error by a fingerprint sensor in an electronic device.

Another aspect of the present disclosure is to provide an apparatus and method for preventing a touch recognition error from occurring on a touch panel by fingerprint recognition in an electronic device.

According to an aspect of the present disclosure, a fingerprint recognition method in an electronic device includes deactivating touch recognition using a touch panel based on first touch information on a fingerprint sensor, and performing fingerprint recognition based on second touch information on the fingerprint sensor.

According to another aspect of the present disclosure, an electronic device includes a touch panel, a fingerprint sensor, and a processor configured to deactivate touch recognition using the touch panel based on first touch information on the fingerprint sensor, and perform touch recognition based on second touch information on the fingerprint sensor.

BRIEF DESCRIPTION OF THE DRAWINGS

The above and other aspects, features and advantages of the present disclosure will become more apparent from the following detailed description when taken in conjunction with the accompanying drawings in which.

DETAILED DESCRIPTION OF EMBODIMENTS OF THE PRESENT INVENTION

Figure 1:
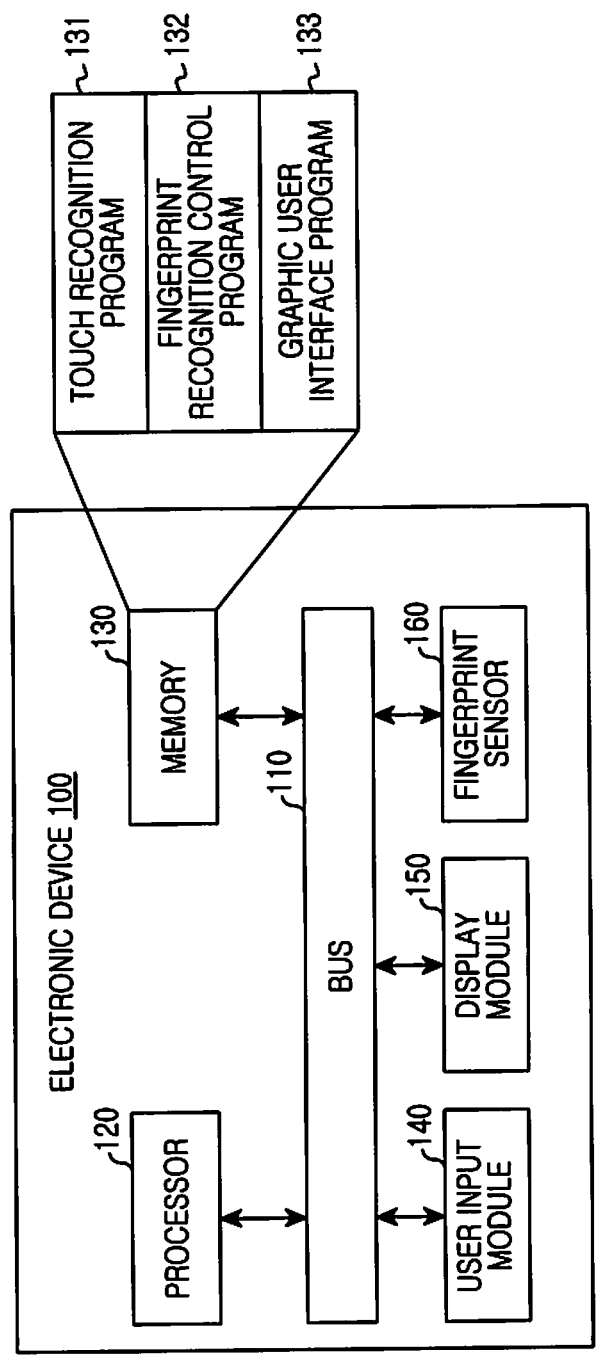
FIG. 1 illustrates a block configuration of an electronic device according to an embodiment of the present disclosure.

The following description with reference to the accompanying drawings is provided to assist in a comprehensive understanding of embodiments of the present disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. Descriptions of well-known functions and constructions may be omitted for the sake of clarity and conciseness.

The terms and words used in the following description and claims are not limited to their dictionary meanings, but are merely used to enable a clear and consistent understanding of the present disclosure. Accordingly, it should be apparent to those skilled in the art that the following description of embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an electronic device in an embodiment of the present disclosure includes one or more of a smart phone, a tablet personal computer (PC), a mobile phone, a video phone, an e-book reader, a desktop PC, a laptop PC, a netbook computer, a personal data assistant (PDA), a portable media player (PMP), a motion pictures experts group (MPEG) Layer Audio 3 (MP3) player, jewelry, electronic accessory, camera, a wearable device, a watch, a refrigerator, an air conditioner, a cleaner, an artificial intelligence robot, a television (TV), a digital video disc (DVD) player, an audio set, an oven, a microwave oven, a washing machine, a microwave bracelet, an electronic collar, an air purifier, an electronic picture frame, medical equipment, navigation equipment, a satellite signal receiver, an enhanced data rate (EDR), a fourteen data rate (FDR), a set-top box, a TV box, an electronic dictionary, an automotive infotainment device, marine electronics, avionics, security equipment, an electronic garment, an electronic key, a camcorder, a game console, a head-mounted display (HMD), a flat panel display, an electronic album, some of furniture or a building/a structure including an electronic device, an electronic board, an electronic signature input device, and a projector. In addition, it is obvious to those skilled in the art that an electronic device according to an embodiment of the present disclosure is not limited to the above-described devices.

Hereinafter, an operation of deactivating touch recognition by using a touch panel may include an operation of deactivating drive of the touch panel or limiting execution of a service corresponding to touch information sensed through the touch panel.

FIG. 1 illustrates a block configuration of an electronic device according to an embodiment of the present disclosure.

Referring to FIG. 1, an electronic device 100 includes a bus 110, a processor 120, a memory 130, an input module 140, a display module 150, and a fingerprint sensor 160. At least one of the processor 120 and the memory 130 may exist in plurality.

The bus 110 mutually connects, and controls communication between elements included in the electronic device 100.

The processor 120 controls so that the electronic device 100 provides various services. For example, the processor 120 may interpret commands received through the bus 110 from one or more other elements (e.g. the memory 130, the input module 140, the display module 150, the fingerprint sensor 160) included in the electronic device 100, and execute operations or data processing according to the interpreted commands.

The processor 120 executes one or more programs stored in the memory 130 and controls so that the electronic device 100 provides various services. For example, the processor 120 may execute fingerprint recognition by executing a fingerprint recognition control program 132 and identifying whether a fingerprint recognition mode conversion event occurs based on touch information on the fingerprint sensor 160.

When sensing occurrence of the fingerprint recognition mode conversion event, the processor 120 may execute the touch recognition control program 131 and deactivate the touch recognition using a touch panel. For example, when a first swipe is sensed on the fingerprint sensor 160, the processor 120 recognizes that the fingerprint recognition mode conversion event occurs and deactivates touch recognition on the touch panel. The processor 120 may deactivate touch recognition for the entire touch panel or at least some region adjacent to the fingerprint sensor 160 in the touch panel. The processor 120 may perform fingerprint recognition based on second swipe information on the fingerprint sensor 160. For example, when a second swipe direction is opposite to a first swipe direction, the processor 120 may perform fingerprint recognition based on the second swipe information. The swipe may indicate a series of operations that a drag occurs in a certain direction when a finger touch on the fingerprint sensor 160 is held.

In another example, when sensing a touch on the fingerprint sensor 160, the processor 120 may identify whether the fingerprint recognition mode conversion event occurs based on touch holding time on the fingerprint sensor 160. When the fingerprint recognition mode conversion event occurs, the processor 120 may deactivate touch recognition using the touch panel. The processor 120 may deactivate touch recognition for the entire touch panel or at least some region adjacent to the fingerprint sensor 160 in the touch panel. The processor 120 may perform fingerprint recognition based on swipe information on the fingerprint sensor 160.

In another example, when a touch on the fingerprint sensor 160 is sensed, the processor 120 identifies whether the fingerprint recognition mode conversion event occurs based on the number of touches on the fingerprint sensor 160 sensed during a reference time. When the fingerprint recognition mode conversion event occurs, the processor 120 may deactivate touch recognition using the touch panel. The processor 120 may deactivate touch recognition for the entire touch panel or at least some region adjacent to the fingerprint sensor 160. The processor 120 performs fingerprint recognition based on swipe information on the fingerprint sensor 160.

The memory 130 stores commands or data received from at least one element or generated by the at least one of the elements (ex. processor 120, the input module 140, the display module 150, or the fingerprint sensor 160) included in the electronic device 100.

The memory 130 stores one or more programs for services by the electronic device 100. For example, the memory 130 may include one or more of a touch recognition control program 131, a fingerprint recognition control program 132, and a graphic user interface (GUI) program 133.

The touch recognition control program 131 may include at least one software component for controlling whether a touch on the touch panel is recognized based on the fingerprint recognition service. For example, when occurrence of the fingerprint recognition mode conversion event is sensed through the fingerprint recognition control program 133, the touch recognition control program 131 may control the touch recognition to be deactivated by using the touch panel while the electronic device 100 operates as a fingerprint recognition control program 131. The touch recognition control program 131 may deactivate touch recognition for the entire touch panel or at least some region adjacent to the fingerprint sensor 160.

The fingerprint recognition control program 132 may include at least one software component for providing a fingerprint recognition service based on touch information on the fingerprint sensor 160. In detail, after performing conversion into the fingerprint recognition mode based on first touch information on the fingerprint sensor 160, the fingerprint recognition control program 132 may perform fingerprint recognition based on second touch information. For example, when a first swipe on the fingerprint sensor 160 is sensed, the fingerprint recognition control program 132 may recognize occurrence of the fingerprint recognition mode conversion event. The fingerprint recognition control program 132 may perform the fingerprint recognition based on second swipe information on the fingerprint sensor 160.

In another example, when a touch on the fingerprint sensor 160 is sensed, the fingerprint recognition control program 132 may identify whether the fingerprint recognition mode conversion event occurs based on touch holding time on the fingerprint sensor 160. When the fingerprint recognition mode conversion event occurs, the fingerprint recognition control program 130 performs the fingerprint recognition based on swipe information on the fingerprint sensor 160. In another example, when sensing a touch on the fingerprint sensor 160, the fingerprint recognition control program 132 may identify whether the fingerprint recognition mode conversion event occurs based on the number of touches on the fingerprint sensor 160, which are sensed during the reference time. When the fingerprint recognition mode conversion event occurs, the fingerprint recognition control program 132 may perform fingerprint recognition based on swipe information on the fingerprint sensor 160.

Figure 8A:
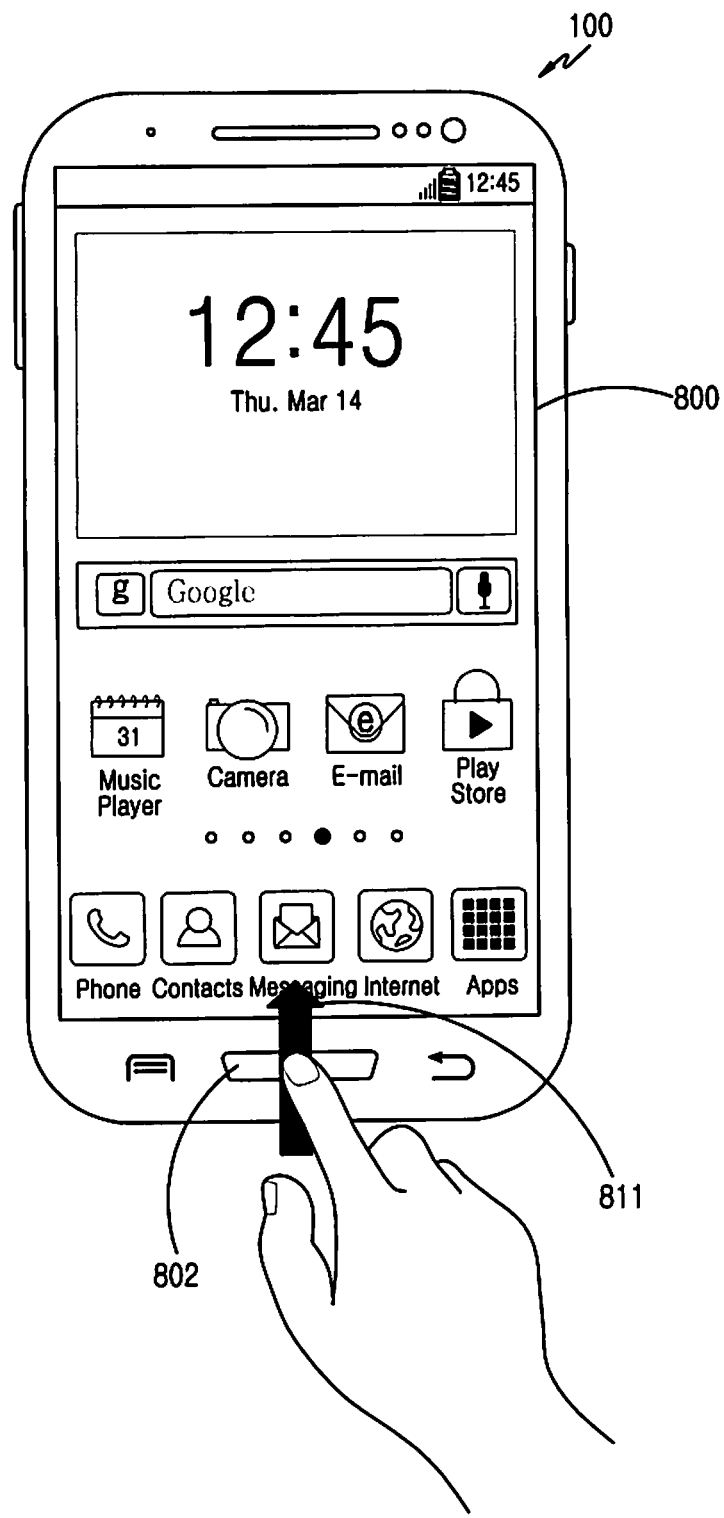
FIGS. 8A to 8F illustrate screen configurations for fingerprint recognition according to embodiment of the present disclosure.
Figure 8B:
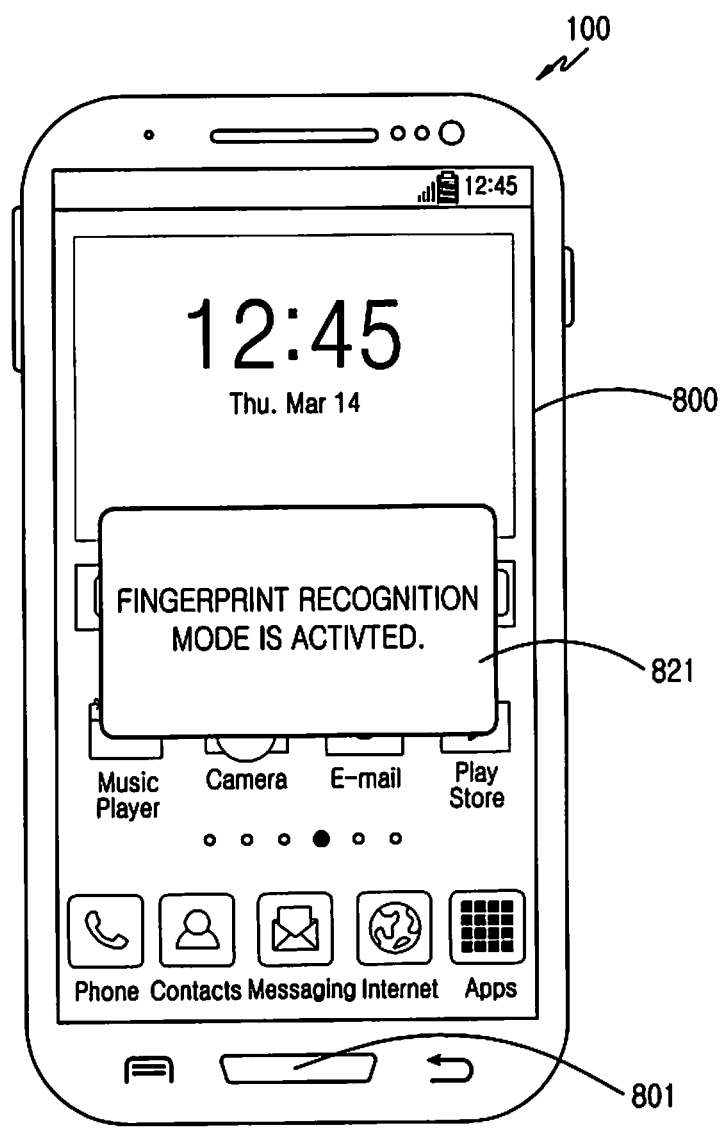
Figure 8C:
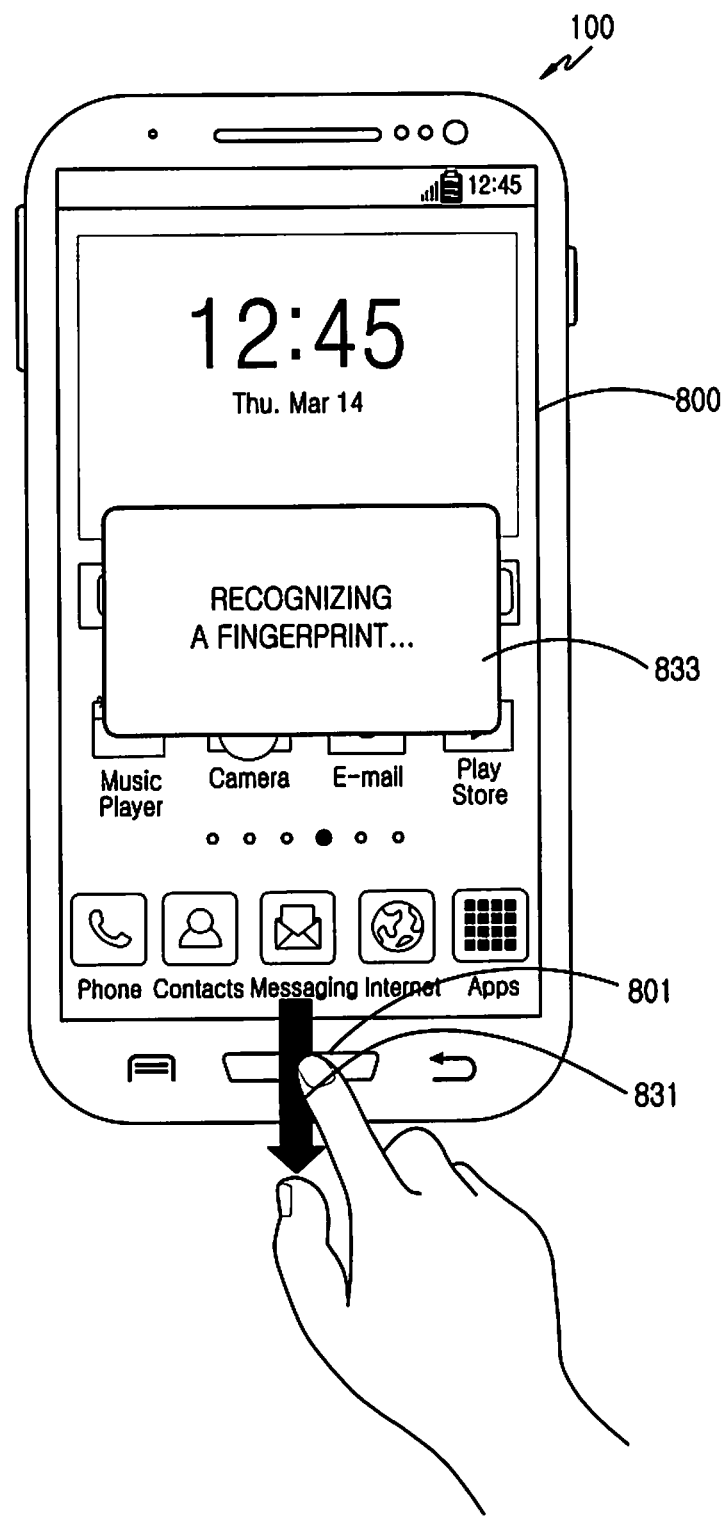
Figure 8D:
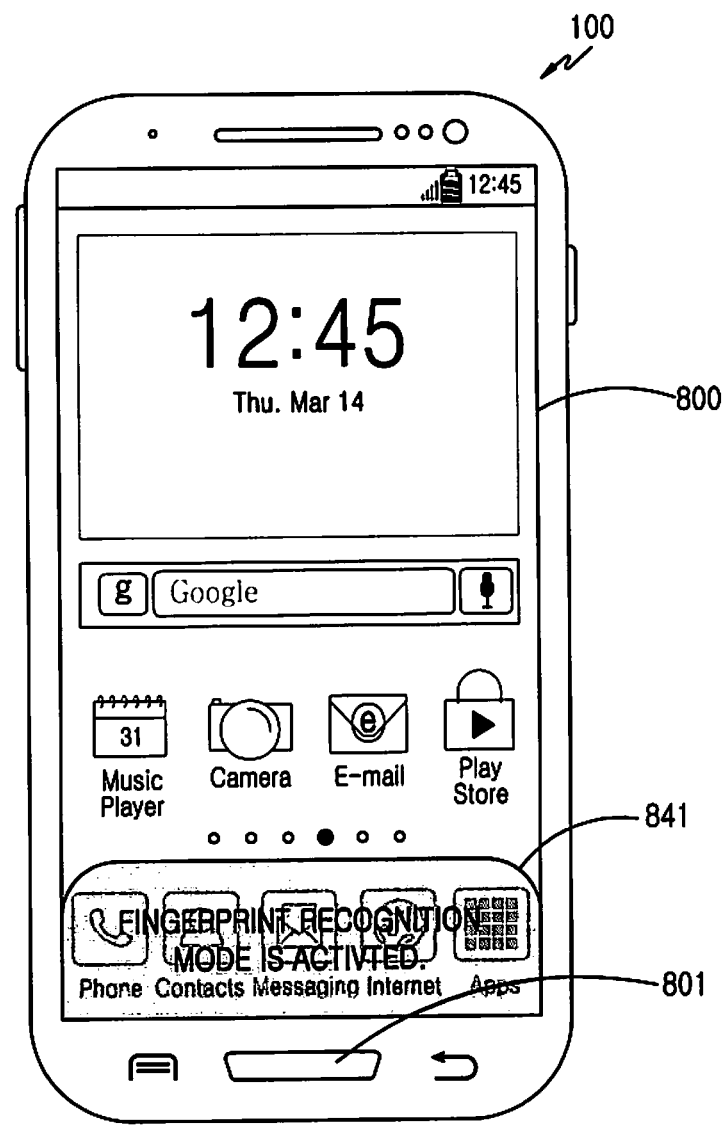
Figure 8E:
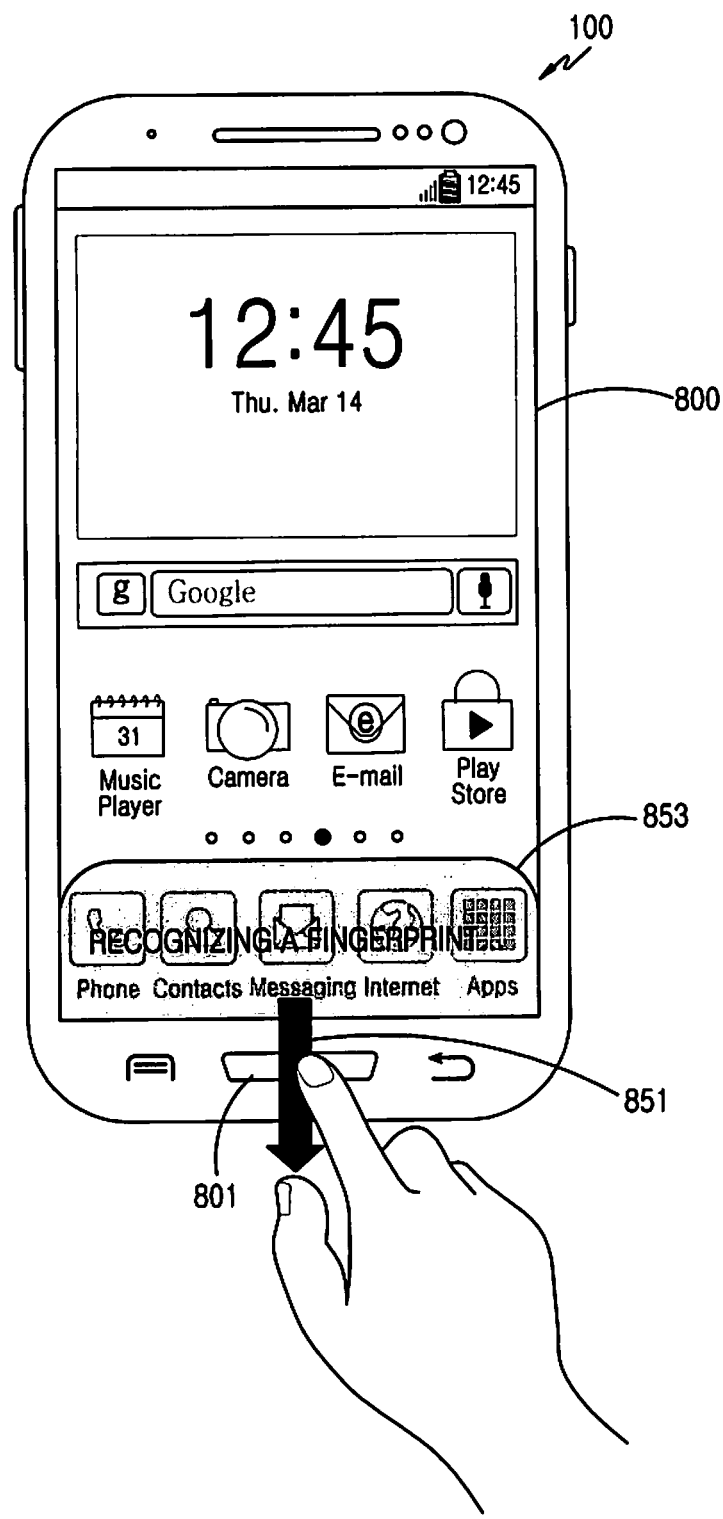

The GUI program 133 may include at least one software component for providing a user interface in graphic to the display module 150. For example, the GUI program 133 controls so that information on the application program driven by the processor 120 is displayed on the display module 150. In another example, when touch recognition on the touch panel is deactivated by the touch recognition control program 131, the GUI program 133 may control so that, as shown in FIGS. 8B to 8D, fingerprint recognition mode activation information 821 or 841 is displayed on the display module 150. In another example, the GUI program 133 may control so that, as shown in FIG. 8C or 8E, "recognizing a fingerprint" 833 or 853 is displayed on the display module 150 while the fingerprint is being recognized through the fingerprint recognition control program 132. In another example, the GUI program 133 may control so that information on a fingerprint recognition ratio according to the fingerprint recognition using the fingerprint recognition control program 132 is displayed on the display module 150.

The input module 140 may transmit commands or data generated by user selection to the processor 120 or the memory 130 through the bus 110. For example, the input module 140 may include one or more keypads including at least one hardware button and a touch panel sensing the touch information.

The display module 150 may display a picture, an image, or data to a user. For example, the display module 150 may display information on the application program driven by the processor 120. In another example, when touch recognition is deactivated by the touch recognition control program 131, the display module 150 may display fingerprint recognition mode activation information 821 or 841 as shown in FIG. 8B or 8D. In another example, the display module 150 may display "recognizing a fingerprint" 833 or 853 as shown in FIG. 8C or 8E. In another example, the display module 150 may control information on fingerprint recognition ratio according to the fingerprint recognition by the processor 120 to be displayed thereon.

The fingerprint sensor 160 may generate fingerprint data corresponding to a finger contacting to the surface thereof. For example, the fingerprint sensor 160 may generate fingerprint data corresponding to a fingerprint shape of the finger based on a current amount changed according to the contact of the finger to the surface thereof.

The fingerprint sensor 160 may sense a fingerprint input direction and output direction sensing data to the processor 120. For example, when the surface of the fingerprint sensor 160 is configured in a grid shape array including an x-axis and a y-axis, the fingerprint sensor 160 may sense the direction in which the fingerprint is input by using position coordinate data of x-axis and y-axis values changed according to a movement of the finger contacting to the surface thereof.

Although not shown in the drawing, the electronic device 100 may further include a communication module connecting communication with one or more other electronic devices, a server, or one or more peripheral devices. For example, the communication module may support one or more of a short-range communication protocol (e.g. WiFi, Bluetooth® (BT), near field communication (NFC)) and network communication (e.g. the Internet, a local area network (LAN), a wireless access network (WAN), an electrical communication network, a cellular network, a satellite network, and a plain old telephone service (POTS)).

In the above-described embodiments, the processor 120 may execute software components stored in the memory 130 in one module and provide the fingerprint recognition service.

Figure 2:
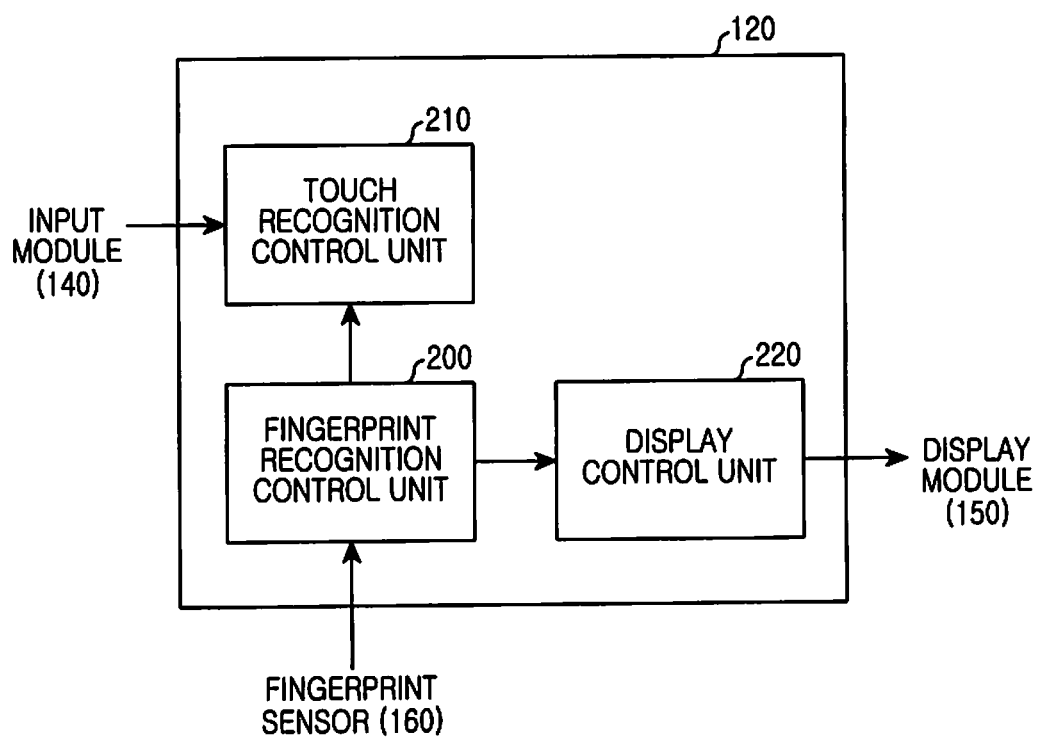
FIG. 2 illustrates a detailed block configuration of a processor according to an embodiment of the present disclosure.

In another embodiment, the processor 120 may be configured to include a component for providing the fingerprint recognition service as separate modules as shown in FIG. 2.

FIG. 2 illustrates a detailed block configuration of a processor according to an embodiment of the present disclosure.

Referring to FIG. 2, the processor 120 includes a fingerprint recognition control unit 200, a touch recognition control unit 210 and a display control unit 220.

The fingerprint recognition control unit 200 provides the fingerprint recognition service based on touch information on the fingerprint sensor 160. The fingerprint recognition control unit 200 may execute the fingerprint recognition control program 132 stored in the memory 130 and provide the fingerprint recognition service based on touch information on the fingerprint sensor 160. Specifically, the fingerprint recognition control unit 200 performs conversion into a fingerprint recognition mode based on first touch information on the fingerprint sensor 160, and then may perform fingerprint recognition based on second touch information on the fingerprint sensor 160.

For example, when a first swipe is sensed on the fingerprint sensor 160, the fingerprint recognition control unit 200 may recognize that the fingerprint recognition mode conversion event occurs. The fingerprint recognition control unit 200 may perform fingerprint recognition based on the second swipe information on the fingerprint sensor 160.

In another example, when a touch is sensed on the fingerprint sensor 160, the fingerprint recognition control unit 200 may identify whether the fingerprint recognition mode conversion event occurs based on touch holding time on the fingerprint sensor 160. When the fingerprint recognition mode conversion event occurs, the fingerprint recognition control unit 200 may perform fingerprint recognition based on swipe information on the fingerprint sensor 160.

In another example, when a touch is sensed on the fingerprint sensor 160, the fingerprint recognition control unit 200 may identify whether the fingerprint recognition mode conversion event occurs based on the number of touches on the fingerprint sensor 160. When the fingerprint recognition mode conversion event occurs, the fingerprint recognition control unit 200 may perform fingerprint recognition based on swipe information on the fingerprint sensor 160.

The touch recognition control unit 210 controls whether touch recognition is performed on the touch panel based on the fingerprint recognition service through the fingerprint recognition control unit 200. The touch recognition control unit 210 may execute the touch recognition control program 131 and control whether the touch recognition is performed on the touch panel based on the fingerprint recognition service. For example, when occurrence of the fingerprint recognition mode conversion event is sensed through the fingerprint recognition control unit 200, the touch recognition control unit 210 may deactivate the touch recognition for the entire touch panel or at least some region adjacent to the fingerprint sensor 160 in the touch panel.

The display control unit 220 may control to provide a user interface in graphic to the display module 150, to execute the GUI program 133 stored in the memory 130, and to provide the user interface in graphic to the display module 150. For example, when the touch recognition for the touch panel is deactivated by the touch recognition control unit 210, the display control unit 220 may control to display fingerprint recognition mode activation information 821 or 841 on the display module 150 as shown in FIG. 8B or 8D. In another example, the display control unit 220 may control to display "recognizing a fingerprint" 833 or 853 on the display module 150 as shown in FIG. 8C or 8E. In another example, the display control unit 220 may control to display information on the fingerprint recognition ratio according to the fingerprint recognition on the display module 150.

In the above-described embodiments, the electronic device 100 may provide the fingerprint recognition service by using the processor 120.

In another embodiment, the electronic device 100 may provide the fingerprint recognition service by using at least one separate module from the processor 120.

Figure 3:
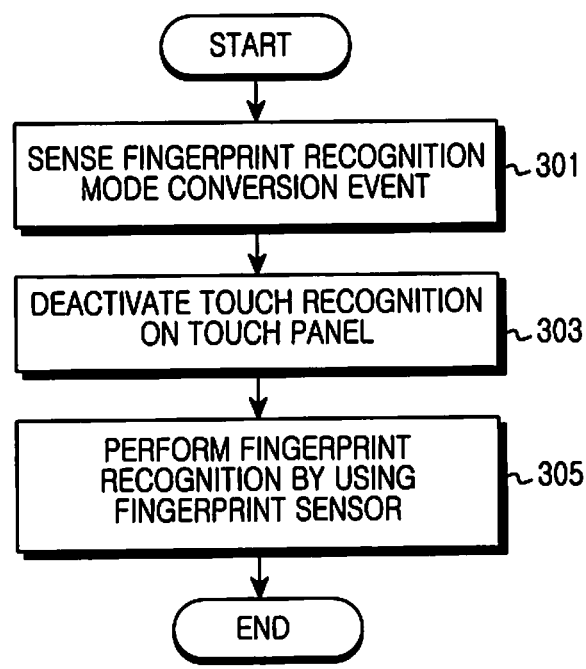
FIG. 3 illustrates a procedure for performing conversion into a fingerprint recognition mode in an electronic device according to an embodiment of the present disclosure.

FIG. 3 illustrates a procedure of performing conversion into the fingerprint recognition mode in an electronic device according to an embodiment of the present disclosure.

Referring to FIG. 3, the electronic device may sense whether the fingerprint recognition mode conversion event occurs in step 301. For example, the electronic device may identify that a swipe on the fingerprint sensor 160 is sensed. The electronic device may identify that a swipe is sensed in a direction to which the fingerprint recognition mode conversion event is mapped. In another example, the electronic device may identify that the fingerprint recognition mode conversion event occurs based on touch holding time on the fingerprint sensor 160. In another example, the electronic device may identify that the fingerprint recognition mode conversion event occurs based on the number of touches on the fingerprint sensor 160 during a reference time. In another example, the electronic device may identify that selection for a fingerprint recognition mode conversion icon is sensed. The electronic device may also identify that a user gesture to which the fingerprint recognition mode conversion event is mapped is sensed.

When the fingerprint recognition conversion event occurs, the electronic device may deactivate the touch recognition for the touch panel in step 303. For example, when the fingerprint recognition mode conversion event occurs, the electronic device may deactivate the touch recognition for the entire touch panel. In another example, when the fingerprint recognition mode conversion event occurs, the electronic device may deactivate the touch recognition for at least some region adjacent to the fingerprint sensor 160 in the touch panel.

The electronic device may perform the fingerprint recognition by using the fingerprint sensor in step 305. For example, the electronic device may generate fingerprint data corresponding to a fingerprint shape of a finger based on a current amount changed according to a finger contact to the surface of the fingerprint sensor 160.

Figure 4:
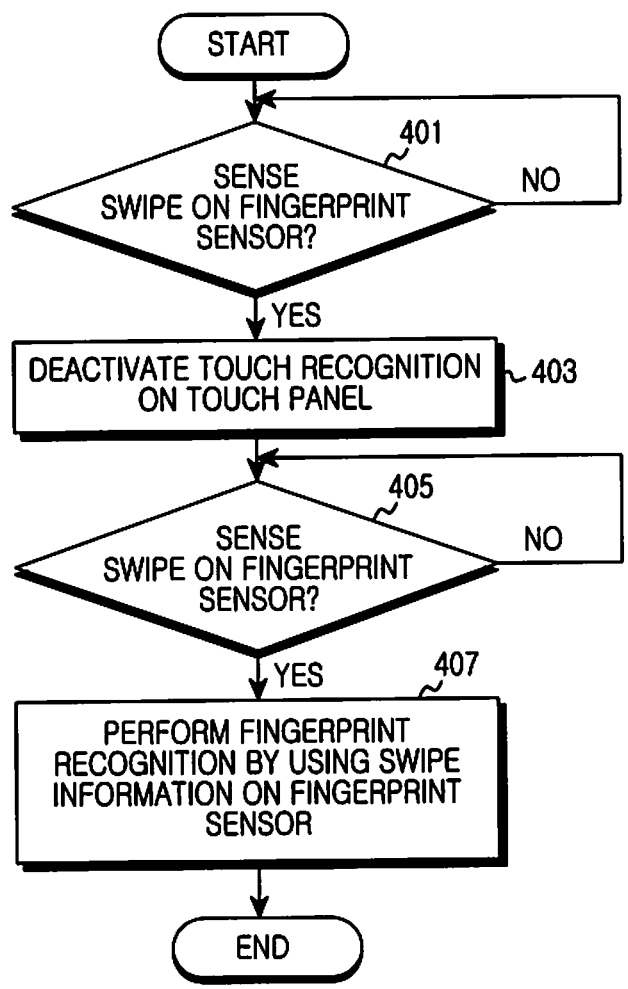
FIG. 4 illustrates a procedure for performing conversion into a fingerprint recognition mode based on swipe information on a fingerprint sensor in an electronic device according to an embodiment of the present disclosure.

FIG. 4 illustrates a procedure for performing conversion into the fingerprint recognition mode based on swipe information on the fingerprint sensor in an electronic device according to an embodiment of the present disclosure.

Referring to FIG. 4, the electronic device may determine whether a first swipe on the fingerprint sensor 160 is sensed in step 401. For example, when the fingerprint sensor 160 is included in a home button 801 as shown in FIG. 8A, the electronic device 100 may determine whether the first swipe 811 on the fingerprint sensor 160 positioned in a top portion of the home button 801 is sensed.

When the first swipe on the fingerprint sensor 160 is sensed, the electronic device may recognize the conversion into the fingerprint recognition mode. Accordingly, the electronic device may deactivate the touch recognition for the touch panel in step 403. For example, the electronic device may deactivate the touch recognition for the entire touch panel 800 as shown in FIG. 8B. In this case, the electronic device may display the fingerprint recognition mode activation information 821 on the display module 150 in order for a user to perceive that the touch recognition is deactivated according to the fingerprint recognition mode. In another example, the electronic device may deactivate the touch recognition for at least some region 841 adjacent to the fingerprint sensor 160 in the touch panel 800. In this case, the electronic device may display the activation information on the fingerprint recognition mode on the region 841 where the touch recognition is deactivated in order for the user to perceive that the touch recognition for the at least some region 841 is deactivated according to the finger recognition mode. The electronic device may display so that a region where the touch recognition is activated is distinguished from a region where the touch recognition is deactivated.

The electronic device may determine whether a second swipe on the fingerprint sensor 160 is sensed in step 405. For example, the electronic device 100 may determine whether the second swipe 831 on the fingerprint sensor 160 positioned in a home button 801 is sensed as shown in FIG. 8C. The electronic device 100 may display a message "recognizing a fingerprint" 833 on the display module 150 in order for the user to perceive that the fingerprint recognition is being performed. In another example, the electronic device 100 may determine that the second swipe 851 on the fingerprint sensor 160 positioned in the home button is sensed as shown in FIG. 8E. The electronic device 100 may display a message "recognizing a fingerprint" 853 on the region 841 where the touch recognition is deactivated in order for the user to perceive that the fingerprint recognition is being performed.

When the second swipe on the fingerprint sensor 160 is sensed, the electronic device may perform fingerprint recognition by using the second swipe information in step 407. For example, the electronic device may generate fingerprint data corresponding to a fingerprint shape of a finger based on a current amount changed according to the second swipe on the fingerprint sensor 160.

In the above-described embodiment, the electronic device may perform conversion into the fingerprint recognition mode based on the first swipe information on the fingerprint sensor 160 positioned in the home button 801, and perform the fingerprint recognition based on the second swipe information on the fingerprint sensor 160. When an input to the home button 801 occurs during swiping on the fingerprint sensor 160, the electronic device 100 may performs a service corresponding to the input to the home button 801. The electronic device 100 may recognize that the swipe on the fingerprint sensor 160 does not occur.

Figure 5:
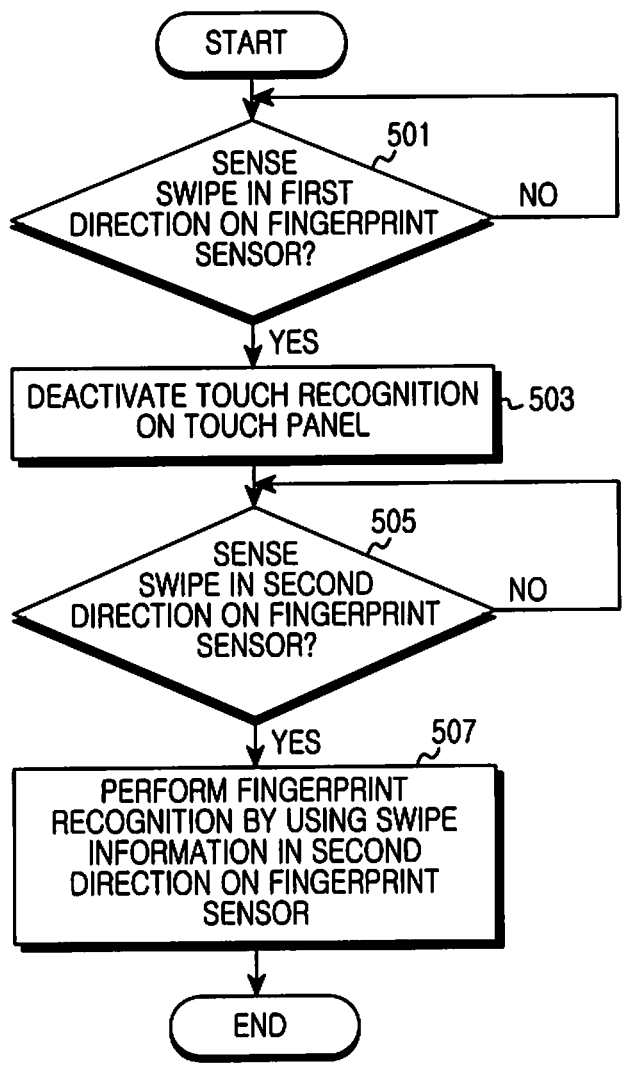
FIG. 5 illustrates a procedure for performing conversion into a fingerprint recognition mode based on swipe information on a fingerprint sensor in an electronic device according to another embodiment of the present disclosure.

FIG. 5 illustrates a procedure for performing conversion into the fingerprint recognition mode based on the swipe information on the fingerprint sensor in an electronic device according to another embodiment of the present disclosure.

Referring to FIG. 5, the electronic device may determine whether the first swipe is sensed in a first direction on the fingerprint sensor 160 in step 501. For example, the fingerprint sensor 160 is included in the home button 801 as shown in FIG. 8A, and the electronic device 100 may determine whether the first swipe 811 is sensed in an upward direction on the fingerprint sensor 160 positioned in the home button 801.

When the first swipe on the fingerprint sensor 160 is sensed, the electronic device recognizes it as conversion into the fingerprint recognition mode. Accordingly, the electronic device deactivates the touch recognition on the touch panel in step 503. For example, the electronic device may deactivate the touch recognition for the entire touch panel 800 as shown in FIG. 8B. In this case, the electronic device may display the fingerprint recognition mode activation information 821 on the display module 150 in order for the user to perceive that the touch recognition is deactivated according to the fingerprint recognition mode. In another example, the electronic device may deactivate the touch recognition on at least some region 841 adjacent to the fingerprint sensor 160 in the touch panel 800. In this case, the electronic device may display the fingerprint recognition mode activation information on the region 841 where the touch recognition is deactivated in order for the user to perceive that the touch recognition on the at least some region 841 is deactivated according to the fingerprint recognition mode. The electronic device may display so that a region where the touch recognition is activated is distinguished from a region where the touch recognition is deactivated.

The electronic device may determine whether the second swipe is sensed in a second direction on the fingerprint sensor 160 in step 505. For example, the electronic device 100 may determine whether the second swipe 831 is sensed in a downward direction on the fingerprint sensor 160 positioned in the home button 801 as shown in FIG. 8C. The electronic device 100 may display a message "recognizing a fingerprint" 833 on the display module 150 in order for the user to perceive that the fingerprint recognition is being performed. In another example, the electronic device 100 may determine whether the second swipe 851 is sensed in the downward direction on the fingerprint sensor 160 positioned in the home button 801. The electronic device 100 may display a message "recognizing a fingerprint" 853 on the region 841 where the touch recognition is deactivated in order for the user to perceive that the fingerprint recognition is being performed. The first and second directions indicating the swipe direction on the fingerprint sensor 160 may be opposite to each other.

When the second swipe on the fingerprint sensor 160 is sensed, the electronic device may perform fingerprint recognition by using the second swipe information in step 507. For example, the electronic device may generate fingerprint data corresponding to a fingerprint shape of a finger based on a current amount changed according to the second swipe on the fingerprint sensor 160.

In the above-described embodiment, the electronic device may perform conversion into the fingerprint recognition mode based on the first swipe information on the fingerprint sensor 160. When a direction of the first swipe on the fingerprint sensor 160 is the same as a reference direction, the electronic device may perform conversion into the fingerprint recognition mode by recognizing that the fingerprint recognition mode conversion event occurs.

Figure 6:
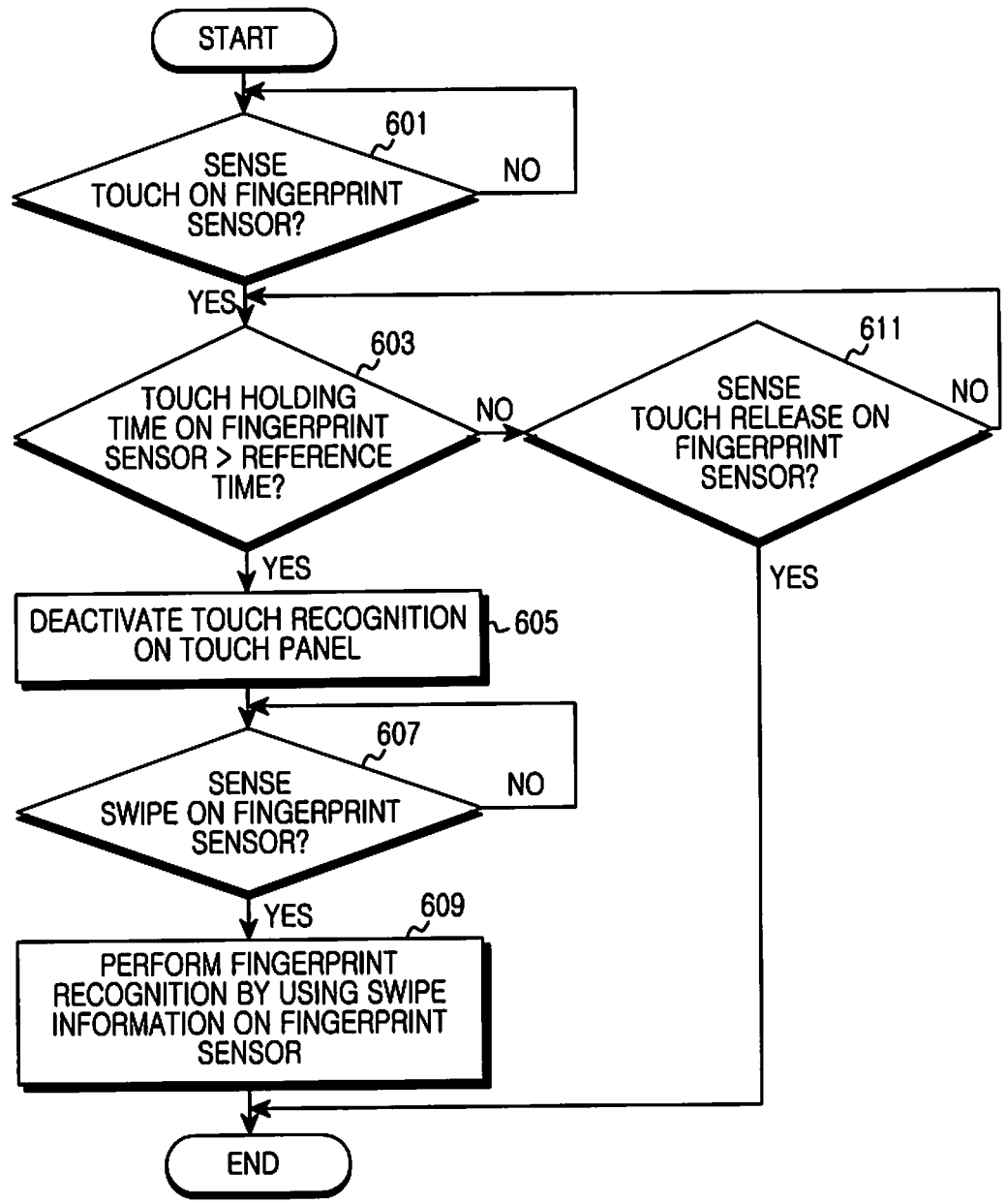
FIG. 6 illustrates a procedure for performing conversion into a fingerprint recognition mode based on touch holding time on a fingerprint sensor in an electronic device according to an embodiment of the present disclosure.

FIG. 6 illustrates a procedure for performing conversion into the fingerprint recognition mode based on a touch holding time on the fingerprint sensor in an electronic device according to an embodiment of the present disclosure.

Figure 8F:
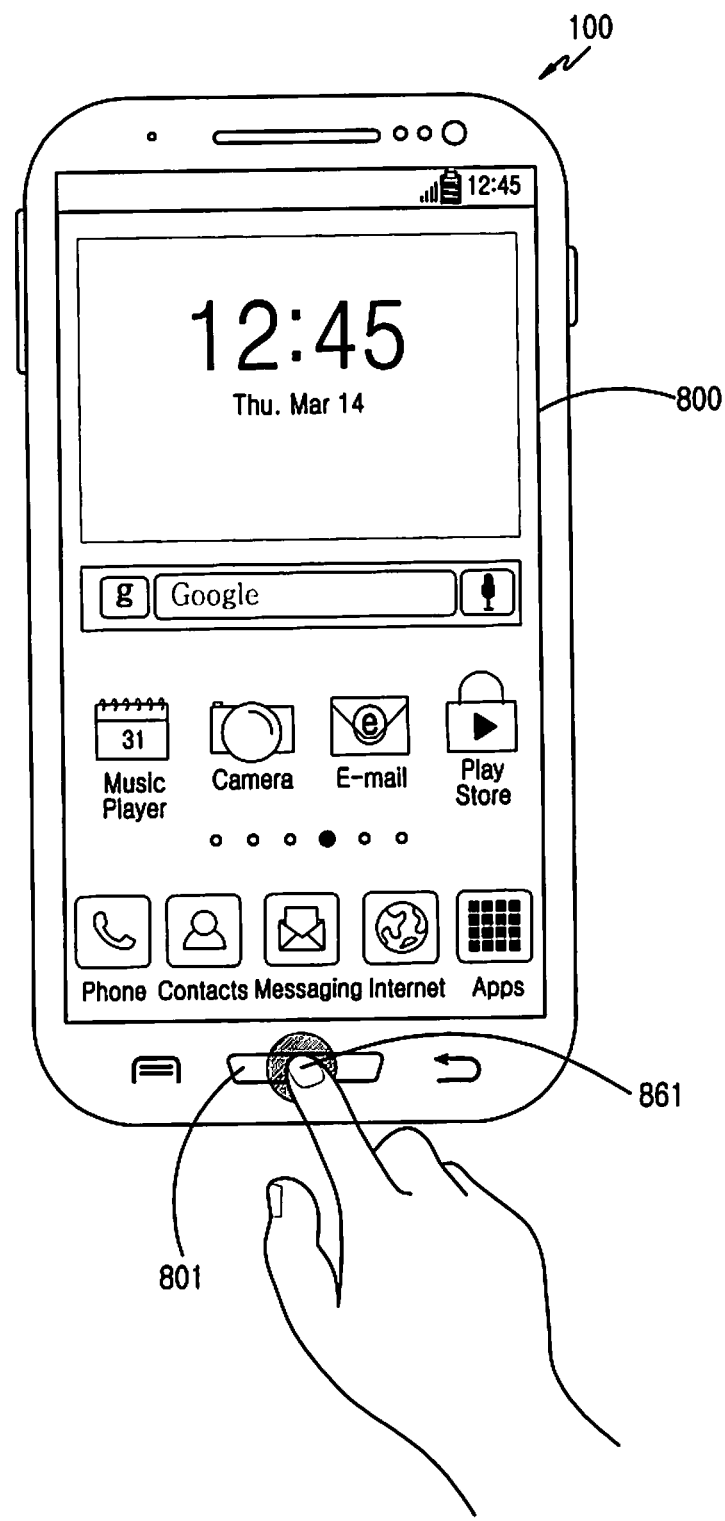

Referring to FIG. 6, the electronic device may determine whether a touch on the fingerprint sensor 160 is sensed in step 601. For example, when the fingerprint sensor 160 is included in the home button 801 as shown in FIG. 8F, the electronic device 100 may determine whether a touch 861 on the fingerprint sensor 160 positioned in the home button 801 is sensed. When an input to the home button 801 occurs during the touch on the fingerprint sensor 160, the electronic device 100 may perform a service corresponding to the input to the home button 801. The electronic device 100 may recognize that a touch on the fingerprint sensor 160 does not occur.

When the touch on the fingerprint sensor 160 is sensed, the electronic device may determine whether touch holding time on the fingerprint sensor 160 is greater than a reference time.

When the touch holding time on the fingerprint sensor 160 is equal or less than the reference time, the electronic device may determine whether a touch on the fingerprint sensor 160 is released in step 611.

When the touch on the fingerprint sensor 160 is released, the electronic device may recognize that conversion into the fingerprint recognition mode is not performed. Accordingly, the electronic device may terminate this algorithm.

When the touch on the fingerprint is not released, the electronic device may identify that the touch holding time on the fingerprint sensor 160 is greater than the reference time in step 603.

In step 603, when the touch holding time on the fingerprint sensor 160 is greater than the reference time, the electronic device may recognize that the conversion into the fingerprint recognition mode is performed. Accordingly, the electronic device may deactivate the touch recognition on the touch panel in step 605. For example, the electronic device may deactivate the touch recognition on the entire touch panel 800 as shown in FIG. 8B. In this case, the electronic device may display the fingerprint recognition mode activation information 821 on the display module 150 in order for the user to perceive that the touch recognition is deactivated according to the fingerprint recognition mode.

In another example, the electronic device may deactivate the touch recognition on at least some region 841 adjacent to the fingerprint sensor 160 in the touch panel 800. In this case, the electronic device may display the fingerprint recognition mode activation information on the region 841 where the touch recognition is deactivated in order for the user to perceive that the touch recognition on the at least some region 841 is deactivated according to the fingerprint recognition mode. The electronic device may display so that a region where the touch recognition is activated is distinguished from a region where the touch recognition is deactivated.

The electronic device may determine whether the swipe on the fingerprint sensor 160 is sensed in step 607. For example, the electronic device 100 may determine whether the swipe 831 on the fingerprint sensor 160 positioned in the home button 801 is sensed as shown in FIG. 8C. The electronic device 100 may display a message "recognizing a fingerprint" 833 on the display module 150 in order for the user to perceive that the fingerprint recognition is being performed. In another example, the electronic device 100 may determine whether the swipe 851 on the fingerprint sensor 160 positioned on the home button 801 is sensed. The electronic device 100 may display a message "recognizing a fingerprint" 853 on the region 841 where the touch recognition is deactivated in order for the user to perceive that the fingerprint recognition is being performed. The first and second directions indicating a swipe direction of the fingerprint sensor 160 may be opposite to each other.

When the swipe on the fingerprint sensor 160 is sensed, the electronic device may perform fingerprint recognition by using the swipe information on the fingerprint sensor 160 in step 609. For example, the electronic device may generate fingerprint data corresponding to a fingerprint shape of a finger based on a current amount changed according to the swipe on the fingerprint sensor 160.

Figure 7:
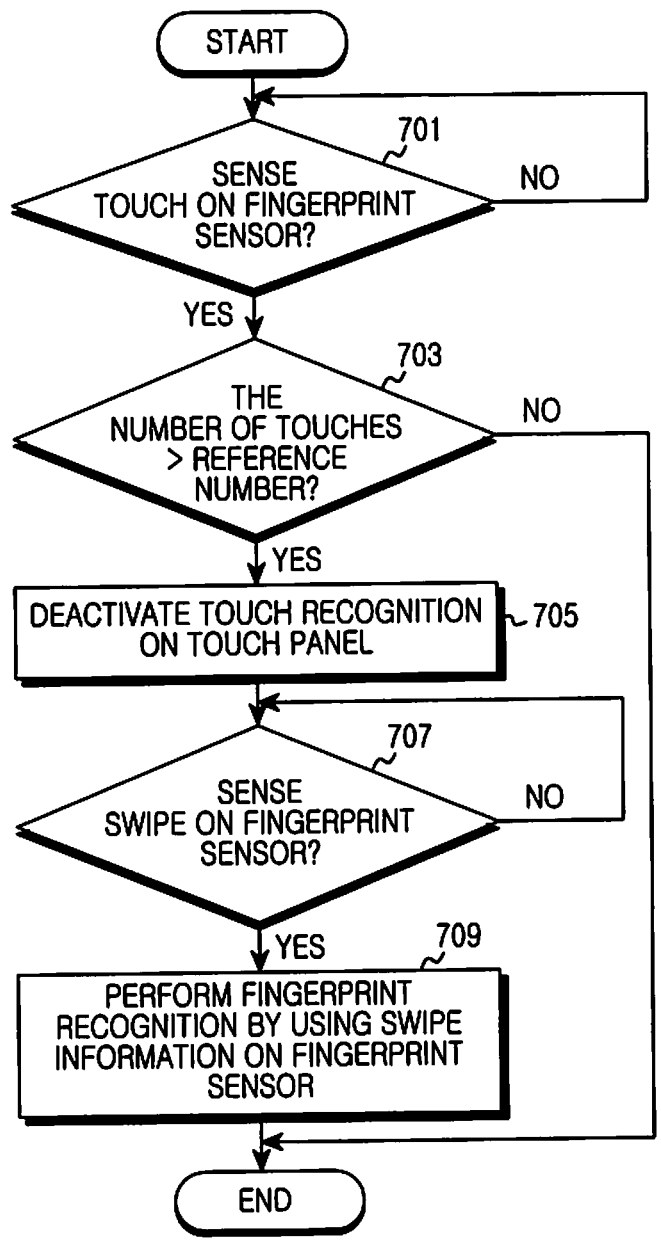
FIG. 7 illustrates a procedure for performing conversion into a fingerprint recognition mode based on the number of touches on a fingerprint sensor in an electronic device according to an embodiment of the present disclosure.

FIG. 7 illustrates a procedure for conversion into the fingerprint recognition mode based on the number of touches on the fingerprint sensor in an electronic device according to an embodiment of the present disclosure.

Referring to FIG. 7, the electronic device may determine whether a touch on the fingerprint sensor 160 is sensed in step 701. For example, when the fingerprint sensor 160 is included in the home button 801 as shown in FIG. 8F, the electronic device 100 may determine whether a touch 861 on the fingerprint sensor 160 positioned in the home button 801 is sensed. When an input to the home button 801 occurs during the touch on the fingerprint sensor 160, the electronic device 100 may perform a service corresponding to the input to the home button 801. At this time, the electronic device 100 may recognize that the touch on the fingerprint sensor 160 does not occur.

When the touch on the fingerprint sensor 160 is sensed, the electronic device may determine whether the number of touches on the fingerprint sensor 160, which is sensed during a reference time, is greater than the reference number. For example, the electronic device may determine whether the number of touches on the fingerprint sensor 160, which is sensed during the reference time from when a touch on the fingerprint sensor 160 is sensed, is greater than the reference number in step 701.

When the number of touches on the fingerprint sensor 160 is equal or less than the reference number, the electronic device may recognize that conversion into the fingerprint recognition mode is not performed. Accordingly, the electronic device may terminate this algorithm.

When the number of touches on the fingerprint sensor 160 is greater than the reference number, the electronic device may recognize that conversion into the fingerprint recognition mode is performed. Accordingly, the electronic device may deactivate the touch recognition on the touch panel in step 705. For example, the electronic device may deactivate the touch recognition on the entire touch panel 800 as shown in FIG. 8B. In this case, the electronic device may display the fingerprint recognition mode activation information 821 on the display module 150 in order for the user to perceive that the touch recognition is deactivated according to the fingerprint recognition mode. In another example, the electronic device may deactivate the touch recognition on at least some region 841 adjacent to the fingerprint sensor 160 in the touch panel 800. In this case, the electronic device may display the fingerprint recognition mode activation information on the region 841 where the touch recognition is deactivated in order for the user to perceive that the touch recognition on the at least some region 841 is deactivated according to the finger recognition mode. The electronic device may display so that a region where the touch recognition is activated is distinguished from a region where the touch recognition is deactivated.

The electronic device may determine whether the swipe on the fingerprint sensor 160 is sensed in step 707. For example, the electronic device 100 may determine whether the swipe 831 on the fingerprint sensor 160 positioned in the home button 801 is sensed. The electronic device 100 may display a message "recognizing a fingerprint" 833 on the display module 150 in order for the user to perceive that the fingerprint recognition is being performed. In another example, the electronic device 100 may determine whether the swipe 851 on the fingerprint sensor 160 positioned in the home button 801 is sensed as shown in FIG. 8E. The electronic device 100 may display a message "recognizing a fingerprint" 853 on the region 841 where the touch recognition is deactivated in order for the user to perceive that the fingerprint recognition is being performed. The first and second directions indicating a swipe direction of the fingerprint sensor 160 may be opposite each other.

When the swipe on the fingerprint sensor 160 is sensed, the electronic device may perform fingerprint recognition by using the swipe information on the fingerprint sensor 160 in step 709. For example, the electronic device may generate fingerprint data corresponding to a fingerprint shape of a finger based on a current amount changed according to the swipe on the fingerprint sensor 160.

The electronic device may constantly identify that a second swipe on the fingerprint sensor 160 is sensed in steps 405, 505, 607, or 707. When the second swipe on the fingerprint sensor 160 is not sensed during a reference time from when conversion into the fingerprint recognition mode is performed, the electronic device may determine not to perform the fingerprint recognition and terminate this algorithm.

It will be appreciated that embodiments of the present disclosure according to the claims and description in the specification can be realized in the form of hardware, software or a combination of hardware and software.

Any such software may be stored in a non-transitory computer readable storage medium which stores one or more programs (software modules) comprising instructions, which when executed by one or more processors in an electronic device, cause the electronic device to perform a method of the present disclosure.

Any such software may be stored in the form of volatile or non-volatile storage such as, for example, a storage device like a read-only memory (ROM), whether erasable or rewritable, or in the form of memory such as, for example, random access memory (RAM), memory chips, device or integrated circuits or on an optically or magnetically readable medium such as a CD, DVD, magnetic disk or magnetic tape. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Such programs may be conveyed electronically via any medium such as a communication signal carried over a wired or wireless connection and embodiments suitably encompass the same.

According to embodiments of the present disclosure, the fingerprint recognition not intended by the user is prevented by performing the fingerprint recognition based on the second touch information on the fingerprint sensor after conversion into the fingerprint recognition mode is performed based on the first touch information on the fingerprint sensor in the electronic device.

In addition, a touch recognition error on the touch panel in the fingerprint recognition is prevented by deactivating the touch recognition on the touch panel when conversion into the fingerprint recognition mode is performed based on the touch information on the fingerprint sensor in the electronic device.

While the present disclosure has been shown and described with reference to certain embodiments thereof, it will be understood by those skilled in the art that various changes in form and details may be made therein without departing from the spirit and scope of the present disclosure as defined by the appended claims. Therefore, the scope of the disclosure is defined not by the detailed description but by the appended claims, and all differences within the scope will be construed as being included in the present disclosure.

What is claimed is:

1. A method in an electronic device, the method comprising:
   receiving a first swipe input through a fingerprint sensor of the electronic device;
   determining whether a direction of the first swipe input is a first direction;
   if the direction of the first swipe input is the first direction, deactivating at least a portion of a touch panel;
   receiving a second swipe input through the fingerprint sensor while at least a portion of the touch panel is deactivated;
   in response to detection of the second swipe input in a second direction, performing fingerprint recognition based on the swipe information of the second direction; and
   restricting the fingerprint recognition if the direction of the first swipe input is different from the first direction.

2. The method of claim 1, wherein the second direction is opposite to the first direction.

3. The method of claim 1, wherein deactivating at least the portion of the touch panel comprises deactivating an entire touch panel.

4. The method of claim 1, further comprising displaying touch recognition deactivation information using the touch panel on a display module, when the at least a portion of the touch panel is deactivated.

5. The method of claim 1, wherein deactivating at least the portion of the touch panel comprises deactivating a touch recognition on at least some region adjacent to the fingerprint sensor in the touch panel.

6. The method of claim 5, further comprising displaying so that a region where a touch recognition is activated is distinguished from a region where the touch recognition is deactivated, when the touch recognition on the at least some region is deactivated.

7. An electronic device comprising:
   a touch panel;
   a fingerprint sensor; and
   a processor configured to:
      receive a first swipe input through the fingerprint sensor;
      determine whether a direction of the first swipe input is a first direction;
      if the direction of the first swipe input is the first direction, deactivate at least a portion of the touch panel;
      receive a second swipe input through the fingerprint sensor while at least a portion of the touch panel is deactivated;
      in response to detection of the second swipe input in a second direction, perform fingerprint recognition based on swipe information of the second direction; and
      restrict the fingerprint recognition if the direction of the first swipe input is different from the first direction.

8. The electronic device of claim 7, wherein the fingerprint sensor is positioned in a top portion of a home button included in the electronic device.

9. The electronic device of claim 7, wherein the second direction is opposite to the first direction.

10. The electronic device of claim 7, wherein the processor is further configured to deactivate an entire region of the touch panel based on the received swipe input in the first direction on the fingerprint sensor.

11. The electronic device of claim 7, further comprising a display configured to display touch recognition deactivation information using the touch panel, when a touch recognition is deactivated using the touch panel by the processor, wherein the touch panel is provided on the display.

12. The electronic device of claim 7, wherein the processor is further configured to deactivate a touch recognition on at least some region adjacent to the fingerprint sensor in the touch panel based on the received swipe input in the first direction on the fingerprint sensor.

13. The electronic device of claim 12, further comprising a display configured to display so that a region where the touch recognition is activated is distinguished from a region where the touch recognition is deactivated, when the touch recognition on the at least some region in the touch panel is deactivated by the processor.

* * * * *